(12) United States Patent
Harding et al.

(10) Patent No.: US 7,492,450 B2
(45) Date of Patent: Feb. 17, 2009

(54) METHODS AND APPARATUS FOR INSPECTING AN OBJECT

(75) Inventors: Kevin George Harding, Nishkayuna, NY (US); Robert William Tait, Brighton, MI (US); Russell Stephen DeMuth, Berne, NY (US)

(73) Assignee: General Electric Company, Schenectady, NY (US)

( * ) Notice: Subject to any disclaimer, the term of this patent is extended or adjusted under 35 U.S.C. 154(b) by 343 days.

(21) Appl. No.: 11/257,182

(22) Filed: Oct. 24, 2005

(65) Prior Publication Data

US 2007/0091302 A1  Apr. 26, 2007

(51) Int. Cl.
  *G01N 21/00* (2006.01)
(52) U.S. Cl. ............... 356/237.2; 356/237.1; 356/237.6
(58) Field of Classification Search ............ 250/201.3; 356/237.1–237.5, 394, 513, 603; 359/290
  See application file for complete search history.

(56) References Cited

U.S. PATENT DOCUMENTS

| | | | | |
|---|---|---|---|---|
| 3,644,047 A * | 2/1972 | Brown et al. ............... 356/458 |
| 4,377,340 A * | 3/1983 | Green et al. ............. 356/237.3 |
| 4,452,534 A * | 6/1984 | Gribanov et al. ........... 356/513 |
| 4,585,947 A | 4/1986 | Liptay-Wagner et al. |
| 4,643,578 A * | 2/1987 | Stern ........................ 356/608 |
| 4,686,374 A | 8/1987 | Liptay-Wagner et al. |
| 4,818,108 A * | 4/1989 | Eppinger .................... 356/513 |
| 4,842,411 A * | 6/1989 | Wood ........................ 356/603 |
| 5,187,539 A * | 2/1993 | Adachi et al. .............. 356/124 |
| 5,307,151 A | 4/1994 | Hof et al. |
| 5,504,575 A * | 4/1996 | Stafford ...................... 356/330 |
| 5,506,676 A * | 4/1996 | Hendler et al. ........... 356/237.1 |
| 5,589,942 A * | 12/1996 | Gordon ...................... 356/611 |
| 5,594,556 A * | 1/1997 | Vronsky et al. ............. 358/482 |
| 5,602,645 A * | 2/1997 | Tabata et al. ................ 356/394 |
| 5,852,672 A * | 12/1998 | Lu ............................ 382/154 |
| 6,028,671 A | 2/2000 | Svetkoff et al. |
| 6,064,759 A | 5/2000 | Buckley et al. |
| 6,069,703 A * | 5/2000 | Banet et al. .................. 356/432 |
| 6,417,916 B1 * | 7/2002 | Dengler et al. ............. 356/35.5 |
| 6,487,012 B1 * | 11/2002 | Khoshnevis et al. ........ 359/407 |
| 6,639,685 B1 | 10/2003 | Gu et al. |
| 6,678,057 B2 | 1/2004 | Harding et al. |
| 6,747,783 B1 * | 6/2004 | Sandstrom .................. 359/290 |
| 6,768,543 B1 * | 7/2004 | Aiyer ...................... 356/237.4 |
| 6,828,554 B2 * | 12/2004 | Hiroi et al. .................. 250/307 |
| 6,909,105 B1 * | 6/2005 | Heintzmann et al. ... 250/559.04 |
| 7,180,588 B2 * | 2/2007 | Geshwind et al. ........... 256/310 |
| 7,292,346 B2 * | 11/2007 | De Groot et al. ............ 356/496 |
| 2002/0014577 A1 | 2/2002 | Ulrich et al. |
| 2005/0111726 A1 | 5/2005 | Hackney et al. |

OTHER PUBLICATIONS

Qingying Hu et al., "Shiny Parts Measurement Using Color Separation," Oct. 24, 2005, 8 page Abstract, GE GRC Schenectady, NY.

* cited by examiner

*Primary Examiner*—L. G Lauchman
*Assistant Examiner*—Jarreas C Underwood
(74) *Attorney, Agent, or Firm*—William Scott Andes, Esq.; Armstrong Teasdale LLP

(57) ABSTRACT

A method for inspecting an object using a light measurement system that includes a light source and an imaging sensor. The method includes emitting light from the light source, dispersing light emitted from the light source into one of a diffraction pattern and an interference pattern, and imaging the patterned light onto the object using a lens.

25 Claims, 5 Drawing Sheets

METHODS AND APPARATUS FOR INSPECTING AN OBJECT

BACKGROUND OF THE INVENTION

This application relates generally to inspecting objects, and more specifically to methods and apparatus for inspecting objects using a light measurement system.

Objects are sometimes inspected, for example, to determine a size and/or shape of all or a portion of the object and/or to detect defects in the object. For example, some gas turbine engine components, such as turbine or compressor blades, are inspected to detect fatigue cracks that may be caused by vibratory, mechanical, and/or thermal stresses induced to the engine. Moreover, and for example, some gas turbine engine blades are inspected for deformations such as platform orientation, contour cross-section, bow and twist along a stacking axis, thickness, and/or chord length at given cross-sections. Over time, continued operation of the object with one or more defects may reduce performance of the object and/or lead to object failures, for example, as cracks propagate through the object. Accordingly, detecting defects of the object as early as possible may facilitate increasing the performance of the object and/or reducing object failures.

To facilitate inspecting objects, at least some objects are inspected using a light measurement system that projects a structured light pattern onto a surface of the object. The light measurement system images the structured light pattern reflected from the surface of the object and then analyzes the deformation of the reflected light pattern to calculate surface features of the object. However, at least some known light measurement systems are unable to adjust distribution of light over different areas of the illuminated surface of the object, possibly causing some areas of the illuminated surface to be too dark or too light to inspect. Some known light measurement systems utilize liquid crystal display (LCD), liquid crystal on silicon (LCOS), or digital micromirror device (DMD) devices as light sources that can adjust distribution of light over different areas of the illuminated object surface. However, at least some known LCD, LCOS, and DMD devices may have lower resolution than is desired for the light source. Moreover, at least some known LCD, LCOS, and DMD devices may not be capable of accurately constructing a smooth pattern of light, for example a sine wave, but rather may create a binary approximation. Film-type attenuators have also been used to control distribution of light over different areas of the illuminated surface of the object, for example to darken areas of the illuminated surface that may be too light to measure. However, at least some known attenuators may need to be changed when a different object is inspected and/or when the object, a light source, and/or an imaging sensor is re-orientated.

BRIEF DESCRIPTION OF THE INVENTION

In one aspect, a method is provided for inspecting an object using a light measurement system that includes a light source and an imaging sensor. The method includes emitting light from the light source, dispersing light emitted from the light source into one of a diffraction pattern and an interference pattern, and imaging the patterned light onto the object using a lens.

In another aspect, a structured light measurement system for inspecting an object includes a structured light source configured to project structured light onto a surface of the object, an imaging sensor configured to receive structured light reflected from the object surface, a grating positioned to disperse light emitted by the structured light source into at least one of a diffraction pattern and an interference pattern, and a lens positioned to image patterned light received from the grating onto the object.

In another aspect, a structured light measurement system for inspecting an object includes a laser configured to project structured light onto a surface of the object, an imaging sensor configured to receive structured light reflected from the object surface, a beam splitter positioned at least partially between the laser and the object for dispersing light emitted by the laser into an interference pattern, and a lens positioned to image patterned light received from the beam splitter onto the object.

DETAILED DESCRIPTION OF THE INVENTION

Figure 1:
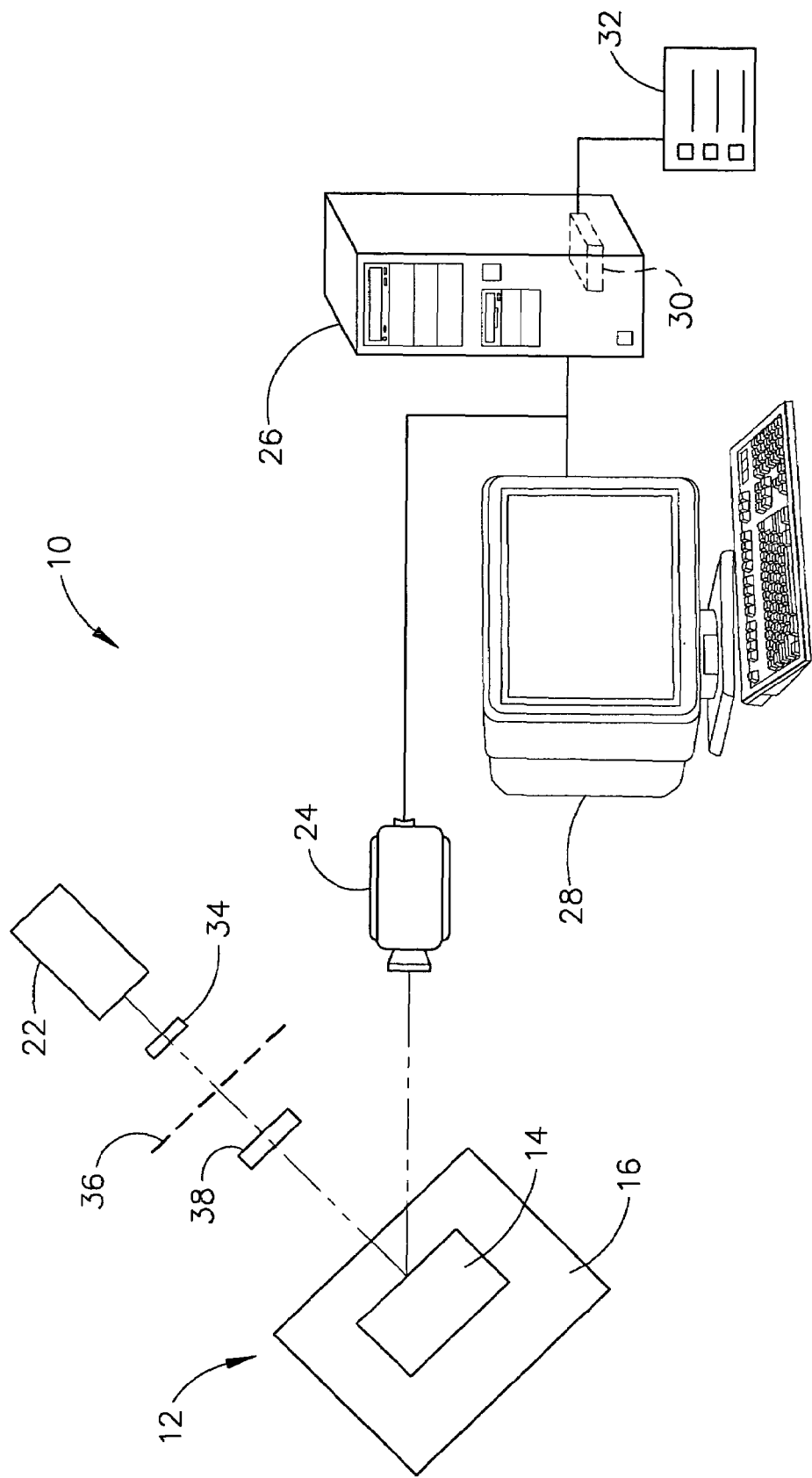
FIG. 1 is a block diagram of an exemplary embodiment of a structured light measurement system.

FIG. 1 is a block diagram of an exemplary embodiment of a structured light measurement system 10 that is used to measure a plurality of surface features of an object 12. For example, system 10 may be used to inspect and determine surfaces of object 12, wherein the surfaces may include features such as tilts, bends, twists, and/or warps when compared to a model representative of object 12.

In the exemplary embodiment, object 12 is a rotor blade, such as, but not limited to, a compressor or turbine blade utilized in a turbine engine. Accordingly, and in the exemplary embodiment, object 12 includes an airfoil 14 extending outwardly from a platform 16. While the following description is directed to inspecting gas turbine engine blades, one skilled in the art will appreciate that system 10 may be utilized to improve structured light imaging for any object.

System 10 includes a structured light source 22 such as, but not limited to, a white light lamp, a laser, a light emitting diode (LED), a liquid crystal display (LCD) device, a liquid crystal on silicon (LCOS) device, and/or a digital micromirror device (DMD). System 10 also includes one or more imaging sensors 24 that receive structured light reflected from object 12. In the exemplary embodiment, imaging sensor 24 is a camera that receives and creates images using structured light reflected from object 12, although system 10 may utilize other imaging sensors 24. One or more computers 26 process images received from sensors 24, and a monitor 28 may be utilized to display information to an operator. In one embodiment, computer(s) 26 include a device 30, for example, a floppy disk drive, CD-ROM drive, DVD drive, magnetic optical disk (MOD) device, and/or any other digital device including a network connecting device such as an Ethernet device for reading instructions and/or data from a computer-readable medium 32, such as a floppy disk, a CD-ROM, a DVD, and/or another digital source such as a network or the Internet, as well as yet to be developed digital means. In another embodiment, computer(s) 26 execute instructions stored in firmware (not shown). Computer(s) 26 are programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

System 10 also includes a lens 34, a grating 36, and a lens 38. Although other lens 34 may be used, in some embodiments lens 34 is a field lens, such as, but not limited to, a biconvex lens. Lens 34 is positioned at least partially between light source 22 and grating 36, and receives and channels light emitted from light source 22 through grating 36. Grating 36 is positioned at least partially between lens 34 and lens 38 and, in some embodiments, includes a pattern (not shown) that disperses light channeled therethrough into a diffraction pattern. More specifically, in some embodiments, grating 36 includes a pattern of lines and spaces formed on a substrate for dispersing light into a diffraction pattern. In some embodiments, grating 36 includes a pattern of periodic lines and spaces, such as, for example, a ronchi ruling. Although grating 36 may have other patterns, in some embodiments grating 36 includes lines that each have a width between about 10 and about 15 microns, such that the pattern includes between about 50 and about 100 line pairs per millimeter. In other embodiments, grating 36 includes a pattern of lines and spaces wherein the spaces between lines becomes successively smaller adjacent an edge of grating 36, such as, for example, a rectangular slit diffraction pattern. The pattern of lines and spaced may be formed on the substrate using any suitable method and/or structure. For example, in some embodiments the pattern of lines and spaces is formed from a plurality of strands of material, such as, but not limited to metal strands (e.g., chrome strands), attached to and/or embedded within the substrate. In other embodiments, the pattern of lines and spaces is etched into the substrate. Each etched line, in some embodiments, may be filled with a suitable material, such as, but not limited to, metal (e.g., chrome). Although the substrate of grating 36 may be fabricated from other materials, in some embodiments the substrate of grating 36 is fabricated from glass and/or quartz.

In other embodiments, grating 36 includes a pattern (not shown) that disperses light channeled therethrough into an interference pattern, such as, but not limited to, a uniform sine wave pattern of evenly spaced lines. In some embodiments, grating 36 is a phase grating, such as, but not limited to, a photographic recording of a simple series of square lines that has been bleached such that no intensity pattern in seen directly on the recording, but small refractive index changes left on the recording where the lines existed serve as a series of prisms to redirect the light at some plus and minus angle that will then interfere to create an interference pattern.

Lens 38 receives and images the patterned light onto object 12 to illuminate object 12 with light emitted from light source 22. In the exemplary embodiment, lens 38 is a "high-resolution" lens, or more specifically, a lens that facilitates generating an image having a contrast of greater than about 50%. Although other lens 38 may be used, in some embodiments lens 38 is flat field lens, such as, but not limited to, an enlarger lens and/or a lithographic lens.

As described above, in some embodiments light source 22 includes an LCD, a LCOS, and/or a DMD device. Some other known light sources, for example, lasers, light emitting diodes (LEDs), and white light lamps, are unable to adjust distribution of light over different areas of an illuminated surface of object 12. More specifically, some of such other known light sources may be unable to adjust the level of light projected onto different areas of the illuminated surface of object 12. Accordingly, some areas of the illuminated object surface may be too dark or too light to inspect using light sources other than LCD, LCOS, and/or DMD devices. However, some known LCD, LCOS, and DMD devices are capable of adjusting distribution of light emitted therefrom. Accordingly, by using an LCD, a LCOS, and/or a DMD device as light source 22, system 10 can adjust a distribution of light levels projected onto different areas of the illuminated surface of object 12. However, some known LCD, LCOS, and DMD devices may project a lower resolution of light onto object 12 than is desired and/or suitable for inspecting object 12. Moreover, some known LCD, LCOS, and DMD devices may not be capable of accurately constructing a smooth pattern of light, for example a sine wave, but rather may create a binary approximation.

By combining grating 36 and lens 38 with an LCD, LCOS, and/or DMD device as light source 22, system 10 facilitates illuminating object 12 with a smooth pattern of light and facilitates increasing a resolution of light reflected from object 12, as compared to known light measurement systems using LCD, LCOS, and/or DMD devices. More specifically, as light passes through grating 36, grating 36 facilitates dispersing light emitted from light source 22 into a smooth pattern of light, for example, a smooth diffraction or interference pattern. When grating 36 includes a pattern of lines and spaces, the size of the lines and spaces, in combination with a contrast generated by lens 38, can be selected to increase a resolution of light reflected from object 12, as compared to known light measurement systems using LCD, LCOS, and/or DMD devices. Moreover, when grating 36 is a phase grating, the interference created by grating 36, in combination with a contrast generated by lens 38, can be selected to increase a resolution of light reflected from object 12, as compared to known light measurement systems using LCD, LCOS, and/or DMD devices.

Because light source 22 includes an LCD, LCOS, and/or DMD device, system 10 can adjust light levels projected onto different areas of the illuminated surface of object 12. Accordingly, areas of the illuminated surface of object 12 that are too light or too dark can be adjusted such that they are measurable by system 10, and more specifically viewable by imaging sensor 24. Moreover, in some embodiments, an electronic and/or physical mask (not shown) may be used in combination with light source 22 to facilitate precluding light source 22 from illuminating surfaces at locations other than a portion of object 12 that is to be inspected. Such a mask may thereby facilitate reducing inter-reflections between surrounding structure, for example a test fixture, and surfaces of object 12 to be inspected. Moreover, such a mask may facilitate producing an illumination pattern on object 12 that substantially matches a profile of a portion of object 12 to be inspected, as viewed from the location of light source 22.

Figure 2:
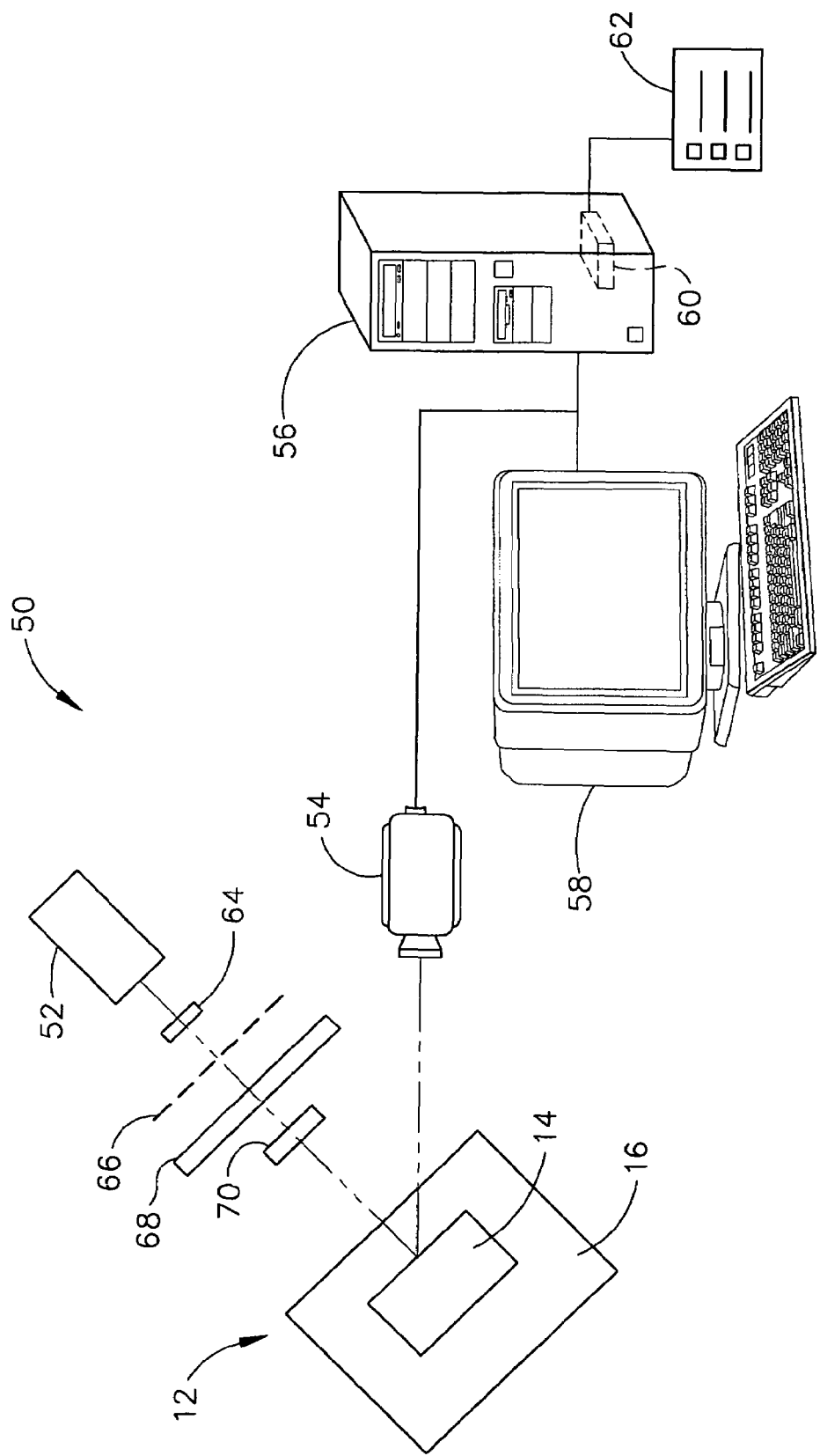
FIG. 2 is a block diagram of an alternative embodiment of a structured light measurement system.

FIG. 2 is a block diagram of an alternative embodiment of a structured light measurement system 50 that is used to measure a plurality of surface features of object 12. More specifically, system 50 is used to inspect and determine surfaces of object 12, wherein the surfaces may include features such as tilts, bends, twists, and/or warps when compared to a model representative of object 12.

In the exemplary embodiment, object 12 is a rotor blade, such as, but not limited to, a compressor or turbine blade utilized in a turbine engine. Accordingly, and in the exemplary embodiment, object 12 includes airfoil 14 extending outwardly from platform 16. While the following description is directed to inspecting gas turbine engine blades, one skilled in the art will appreciate that system 50 may be utilized to improve structured light imaging for any object.

System 50 includes a structured light source 52, such as, but not limited to, a laser, a white light lamp, a light emitting diode (LED), a liquid crystal display (LCD) device, a liquid crystal on silicon (LCOS) device, and/or a digital micromirror device (DMD). System 50 also includes one or more imaging sensors 54 that receive structured light reflected from object 12. In the exemplary embodiment, imaging sensor 54 is a camera that receives and creates images using structured light reflected from object 12, although system 50 may utilize other imaging sensors 54. One or more computers 56 process images received from sensors 54, and a monitor 58 may be utilized to display information to an operator. In one embodiment, computer(s) 56 include a device 60, for example, a floppy disk drive, CD-ROM drive, DVD drive, magnetic optical disk (MOD) device, and/or any other digital device including a network connecting device such as an Ethernet device for reading instructions and/or data from a computer-readable medium 62, such as a floppy disk, a CD-ROM, a DVD, and/or another digital source such as a network or the Internet, as well as yet to be developed digital means. In another embodiment, computer(s) 56 execute instructions stored in firmware (not shown). Computer(s) 56 are programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

System 50 also includes a lens 64, a grating 66, a liquid crystal display (LCD) device 68, and a lens 70. Although other lens 64 may be used, in some embodiments lens 64 is a field lens, such as, but not limited to, a biconvex lens. Lens 64 is positioned at least partially between light source 52 and grating 66, and receives and channels light emitted from light source 52 through grating 66. Grating 66 is positioned at least partially between lens 64 and LCD device 68 and, in some embodiments, includes a pattern (not shown) that disperses light channeled therethrough into a diffraction pattern. More specifically, in some embodiments, grating 66 includes a pattern of lines and spaces formed on a substrate for dispersing light into a diffraction pattern. In some embodiments, grating 66 includes a pattern of periodic lines and spaces, such as, for example, a ronchi ruling. Although grating 66 may have other patterns, in some embodiments grating 66 includes lines that each have a width between about 10 and about 15 microns, such that the pattern includes between about 50 and about 100 line pairs per millimeter. In other embodiments, grating 36 includes a pattern of lines and spaces wherein the spaces between lines becomes successively smaller adjacent an edge of grating 36, such as, for example, a rectangular slit diffraction pattern. The pattern of lines and spaced may be formed on the substrate using any suitable method and/or structure. For example, in some embodiments the pattern of lines and spaces is formed from a plurality of strands of material, such as, but not limited to metal strands (e.g., chrome strands), attached to and/or embedded within the substrate. In other embodiments, the pattern of lines and spaces is etched into the substrate. Each etched line, in some embodiments, may be filled with a suitable material, such as, but not limited to, metal (e.g., chrome). Although the substrate of grating 66 may be fabricated from other materials, in some embodiments the substrate of grating 66 is fabricated from glass and/or quartz.

In other embodiments, grating 36 includes a pattern (not shown) that disperses light channeled therethrough into an interference pattern, such as, but not limited to, a uniform sine wave pattern of evenly spaced lines. In some embodiments, grating 36 is a phase grating, such as, but not limited to, a photographic recording of a simple series of square lines that has been bleached such that no intensity pattern in seen directly on the recording, but small refractive index changes left on the recording where the lines existed serve as a series of prisms to redirect the light at some plus and minus angle that will then interfere to create an interference pattern.

Patterned light dispersed from grating 66 is channeled through LCD device 68 for, for example, control of light distribution and/or masking. Lens 70 receives and images the patterned light onto object 12 to illuminate object 12 with light emitted from light source 52. In the exemplary embodiment, lens 70 is a "high-resolution" lens, or more specifically, a lens that facilitates generating an image having a contrast of greater than about 50%. Although other lens 70 may be used, in some embodiments lens 70 is flat field lens, such as, but not limited to, an enlarger lens and/or a lithographic lens.

By combining grating 66 and lens 70 with LCD device 68, system 50 facilitates illuminating object 12 with a smooth pattern of light and facilitates increasing a resolution of light reflected from object 12, as compared to known light measurement systems using LCD, LCOS, and/or DMD devices as light sources. More specifically, as light passes through grating 66, grating 66 facilitates dispersing light emitted from light source 52 into a smooth pattern of light, for example, a smooth diffraction or interference pattern. When grating 66 includes a pattern of lines and spaces, the size of the lines and spaces, in combination with a contrast generated by lens 70, can be selected to increase a resolution of light reflected from object 12, as compared to known light measurement systems using LCD, LCOS, and/or DMD devices as light sources. Moreover, when grating 66 is a phase grating, the interference created by grating 66, in combination with a contrast generated by lens 70, can be selected to increase a resolution of light reflected from object 12, as compared to known light measurement systems using LCD, LCOS, and/or DMD devices.

Because system 50 channels light through LCD device 68, system 50 can adjust light levels projected onto different areas of the illuminated surface of object 12. Accordingly, areas of the illuminated surface of object 12 that are too light or too dark can be adjusted such that they are measurable by system 50, and more specifically viewable by imaging sensor 54. Moreover, in some embodiments, an electronic and/or physical mask (not shown) may be used in combination with light source 52 and/or LCD device 68 to facilitate precluding light source 52 from illuminating surfaces at locations other than a portion of object 12 that is to be inspected. Such a mask may thereby facilitate reducing inter-reflections between surrounding structure, for example a test fixture, and surfaces of object 12 to be inspected. Moreover, such a mask may facilitate producing an illumination pattern on object 12 that substantially matches a profile of a portion of object 12 to be inspected, as viewed from the location of light source 52. Furthermore, because LCD device 68 is not used as light source 52, system 50 may facilitate increasing an operational life of LCD device 68.

Figure 3:
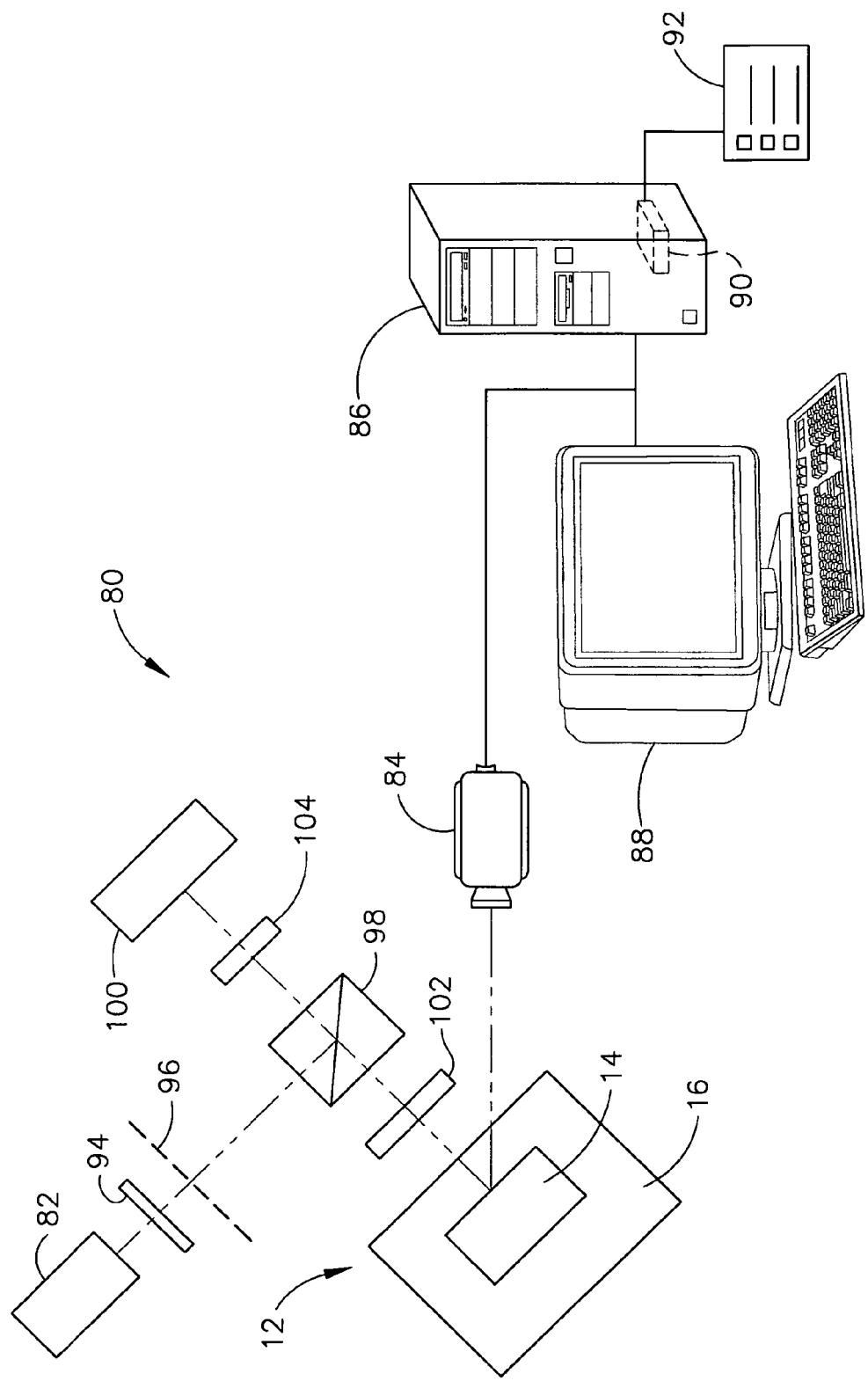
FIG. 3 is a block diagram of an another embodiment of a structured light measurement system.

FIG. 3 is a block diagram of another embodiment of a structured light measurement system 80 that is used to measure a plurality of surface features of object 12. More specifically, system 80 is used to inspect and determine surfaces of object 12, wherein the surfaces may include features such as tilts, bends, twists, and/or warps when compared to a model representative of object 12.

In the exemplary embodiment, object 12 is a rotor blade, such as, but not limited to, a compressor or turbine blade utilized in a turbine engine. Accordingly, and in the exemplary embodiment, object 12 includes airfoil 14 extending outwardly from platform 16. While the following description is directed to inspecting gas turbine engine blades, one skilled in the art will appreciate that system 80 may be utilized to improve structured light imaging for any object.

System 80 includes a structured light source 82, such as, but not limited to, a laser, a white light lamp, a light emitting diode (LED), a liquid crystal display (LCD) device, a liquid crystal on silicon (LCOS) device, and/or a digital micromirror device (DMD). System 80 also includes one or more imaging sensors 84 that receive structured light reflected from object 12. In the exemplary embodiment, imaging sensor 84 is a camera that receives and creates images using structured light reflected from object 12, although system 80 may utilize other imaging sensors 84. One or more computers 86 process images received from sensors 84, and a monitor 88 may be utilized to display information to an operator. In one embodiment, computer(s) 86 include a device 90, for example, a floppy disk drive, CD-ROM drive, DVD drive, magnetic optical disk (MOD) device, and/or any other digital device including a network connecting device such as an Ethernet device for reading instructions and/or data from a computer-readable medium 92, such as a floppy disk, a CD-ROM, a DVD, and/or another digital source such as a network or the Internet, as well as yet to be developed digital means. In another embodiment, computer(s) 86 execute instructions stored in firmware (not shown). Computer(s) 86 are programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

System 80 also includes a lens 94, a grating 96, a mirror 98, a digital micromirror device (DMD) 100, and a lens 102. Although other lens 94 may be used, in some embodiments lens 94 is a field lens, such as, but not limited to, a biconvex lens. Lens 94 is positioned at least partially between light source 82 and grating 96, and receives and channels light emitted from light source 82 through grating 96. Grating 96 is positioned at least partially between lens 94 and mirror 98 and, in some embodiments, includes a pattern (not shown) that disperses light channeled therethrough into a diffraction pattern. More specifically, in some embodiments, grating 96 includes a pattern of lines and spaces formed on a substrate for dispersing light into a diffraction pattern. In some embodiments, grating 96 includes a pattern of periodic lines and spaces, such as, for example, a ronchi ruling. Although grating 96 may have other patterns, in some embodiments grating 96 includes lines that each have a width between about 10 and about 15 microns, such that the pattern includes between about 50 and about 100 line pairs per millimeter. In other embodiments, grating 36 includes a pattern of lines and spaces wherein the spaces between lines becomes successively smaller adjacent an edge of grating 36, such as, for example, a rectangular slit diffraction pattern. The pattern of lines and spaces may be formed on the substrate using any suitable method and/or structure. For example, in some embodiments the pattern of lines and spaces is formed from a plurality of strands of material, such as, hut not limited to, metal strands (e.g., chrome strands), attached to and/or embedded within the substrate. In other embodiments, the pattern of lines and spaces is etched into the substrate. Each etched line, in some embodiments, may be filled with a suitable material, such as, but not limited to, metal (e.g., chrome). Although the substrate of grating 96 may be fabricated from other materials, in some embodiments the substrate of grating 96 is fabricated from glass and/or quartz.

In other embodiments, grating 36 includes a pattern (not shown) that disperses light channeled therethrough into an interference pattern, such as, but not limited to, a uniform sine wave pattern of evenly spaced lines. In some embodiments, grating 36 is a phase grating, such as, but not limited to, a photographic recording of a simple series of square lines that has been bleached such that no intensity pattern in seen directly on the recording, but small refractive index changes left on the recording where the lines existed serve as a series of prisms to redirect the light at some plus and minus angle that will then interfere to create an interference pattern.

Patterned light dispersed from grating 96 is reflected off mirror 98 and directed toward DMD 100 for, for example, control of light distribution and/or masking. Although other mirrors 98 may be used, in some embodiments mirror 98 is a half-silver mirror. Light reflected off DMD 100 is channeled through mirror 98 and received by lens 102. In some embodiments, a wave plate 104 is positioned between DMD 100 and mirror 98 to facilitate reducing a loss of light reflected off mirror 98 and DMD 100. Lens 102 receives and images the patterned light onto object 12 to illuminate object 12 with light emitted from light source 82. In the exemplary embodiment, lens 102 is a "high-resolution" lens, or more specifically, a lens that facilitates generating an image having a contrast of greater than about 50%. Although other lens 102 may be used, in some embodiments lens 102 is flat field lens, such as, but not limited to, an enlarger lens and/or a lithographic lens.

By combining grating 96 and lens 102 with DMD 100, system 80 facilitates illuminating object 12 with a smooth pattern of light and facilitates increasing a resolution of light reflected from object 12, as compared to known light measurement systems using LCD, LCOS, and/or DMD devices as light sources. More specifically, as light passes through grating 96, grating 96 facilitates dispersing light emitted from light source 82 into a smooth pattern of light, for example, a smooth diffraction or interference pattern. When grating 96 includes a pattern of lines and spaces, the size of the lines and spaces, in combination with a contrast generated by lens 102, can be selected to increase a resolution of light reflected from object 12, as compared to known light measurement systems using LCD and/or DMD projectors as light sources. Moreover, when grating 96 is a phase grating, the interference created by grating 96, in combination with a contrast generated by lens 102, can be selected to increase a resolution of light reflected from object 12, as compared to known light measurement systems using LCD, LCOS, and/or DMD devices.

Because system 80 reflects light of DMD 100, system 80 can adjust light levels projected onto different areas of the illuminated surface of object 12. Accordingly, areas of the illuminated surface of object 12 that are too light or too dark can be adjusted such that they are measurable by system 80, and more specifically viewable by imaging sensor 84. Moreover, in some embodiments, an electronic and/or physical mask (not shown) may be used in combination with light source 82 and/or DMD 100 to facilitate precluding light source 82 from illuminating surfaces at locations other than a portion of object 12 that is to be inspected. Such a mask may thereby facilitate reducing inter-reflections between surrounding structure, for example a test fixture, and surfaces of object 12 to be inspected. Moreover, such a mask may facilitate producing an illumination pattern on object 12 that substantially matches a profile of a portion of object 12 to be inspected, as viewed from the location of light source 82. Furthermore, because DMD 100 is not used as light source 82, system 80 may facilitate increasing an operational life of DMD 100.

Figure 4:
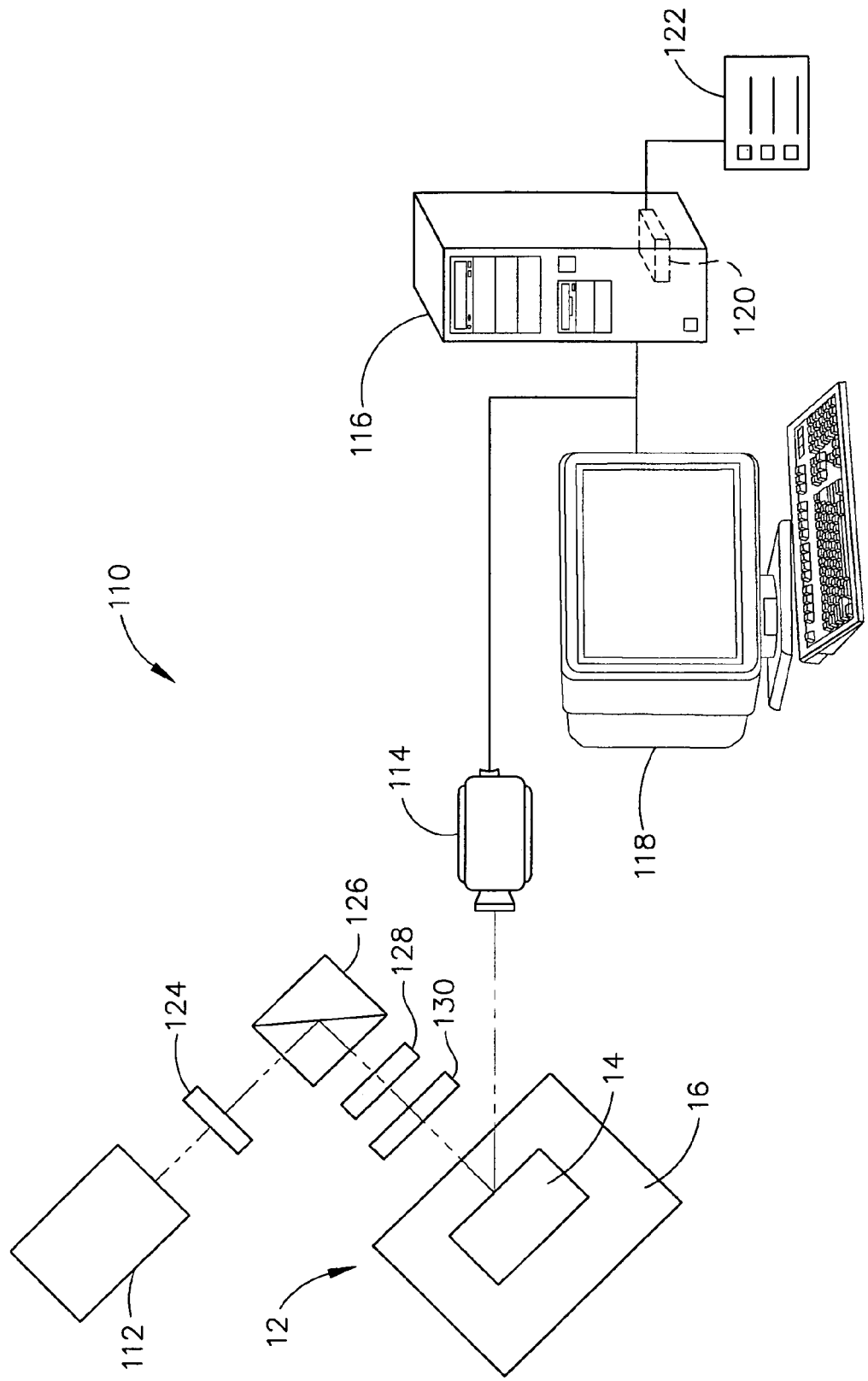
FIG. 4 is a block diagram of an another embodiment of a structured light measurement system.

FIG. 4 is a block diagram of another embodiment of a structured light measurement system 110 that is used to measure a plurality of surface features of object 12. More specifically, system 110 is used to inspect and determine surfaces of object 12, wherein the surfaces may include features such as tilts, bends, twists, and/or warps when compared to a model representative of object 12.

In the exemplary embodiment, object 12 is a rotor blade, such as, but not limited to, a compressor or turbine blade utilized in a turbine engine. Accordingly, and in the exemplary embodiment, object 12 includes airfoil 14 extending outwardly from platform 16. While the following description is directed to inspecting gas turbine engine blades, one skilled in the art will appreciate that system 110 may be utilized to improve structured light imaging for any object.

System 110 includes a laser 112 and one or more imaging sensors 114 that receive structured light reflected from object 12. In the exemplary embodiment, imaging sensor 114 is a camera that receives and creates images using structured light reflected from object 12, although system 110 may utilize other imaging sensors 114. One or more computers 116 process images received from sensors 114, and a monitor 118 may be utilized to display information to an operator. In one embodiment, computer(s) 116 include a device 120, for example, a floppy disk drive, CD-ROM drive, DVD drive, magnetic optical disk (MOD) device, and/or any other digital device including a network connecting device such as an Ethernet device for reading instructions and/or data from a computer-readable medium 122, such as a floppy disk, a CD-ROM, a DVD, and/or another digital source such as a network or the Internet, as well as yet to be developed digital means. In another embodiment, computer(s) 56 execute instructions stored in firmware (not shown). Computer(s) 116 are programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

System 110 also includes a lens 124, a beam splitter 126, a liquid crystal display (LCD) device 128, and a lens 130. Although other lens 124 may be used, in some embodiments lens 124 is a field lens, such as, but not limited to, a biconvex lens. Lens 124 is positioned at least partially between laser 112 and beam splitter 126, and receives and channels light emitted from laser 112 to beam splitter 126. Beam splitter 126 is positioned to disperse light emitted from laser 112 into an interference pattern by splitting and recombining the light. Although other beam splitters 126 may be used, in some embodiments beam splitter 126 is a half-silver mirror.

Patterned light dispersed from beam splitter 126 is channeled through LCD device 128 for, for example, control of light distribution and/or masking. Lens 130 receives and images the patterned light onto object 12 to illuminate object 12 with light emitted from laser 112. In the exemplary embodiment, lens 130 is a "high-resolution" lens, or more specifically, a lens that facilitates generating an image having a contrast of greater than about 50%. Although other lens 130 may be used, in some embodiments lens 130 is flat field lens, such as, but not limited to, an enlarger lens and/or a lithographic lens.

By combining beam splitter 126 and lens 130 with LCD device 128, system 110 facilitates illuminating object 12 with a smooth pattern of light and facilitates increasing a resolution of light reflected from object 12, as compared to known light measurement systems using LCD, LCOS, and/or DMD devices as light sources. More specifically, beam splitter 126 facilitates dispersing light emitted from laser 112 into a smooth interference pattern of light. The interference created by beam splitter 126, in combination with a contrast generated by lens 130, can be selected to increase a resolution of light reflected from object 12, as compared to known light measurement systems using LCD, LCOS, and/or DMD devices.

Because system 110 channels light through LCD device 128, system 110 can adjust light levels projected onto different areas of the illuminated surface of object 12. Accordingly, areas of the illuminated surface of object 12 that are too light or too dark can be adjusted such that they are measurable by system 110, and more specifically viewable by imaging sensor 114. Moreover, in some embodiments, an electronic and/or physical mask (not shown) may be used in combination with laser 112 and/or LCD device 128 to facilitate precluding laser 112 from illuminating surfaces at locations other than a portion of object 12 that is to be inspected. Such a mask may thereby facilitate reducing inter-reflections between surrounding structure, for example a test fixture, and surfaces of object 12 to be inspected. Moreover, such a mask may facilitate producing an illumination pattern on object 12 that substantially matches a profile of a portion of object 12 to be inspected, as viewed from the location of laser 112. Furthermore, because LCD device 128 is not used as a light source, system 110 may facilitate increasing an operational life of LCD device 128.

Figure 5:
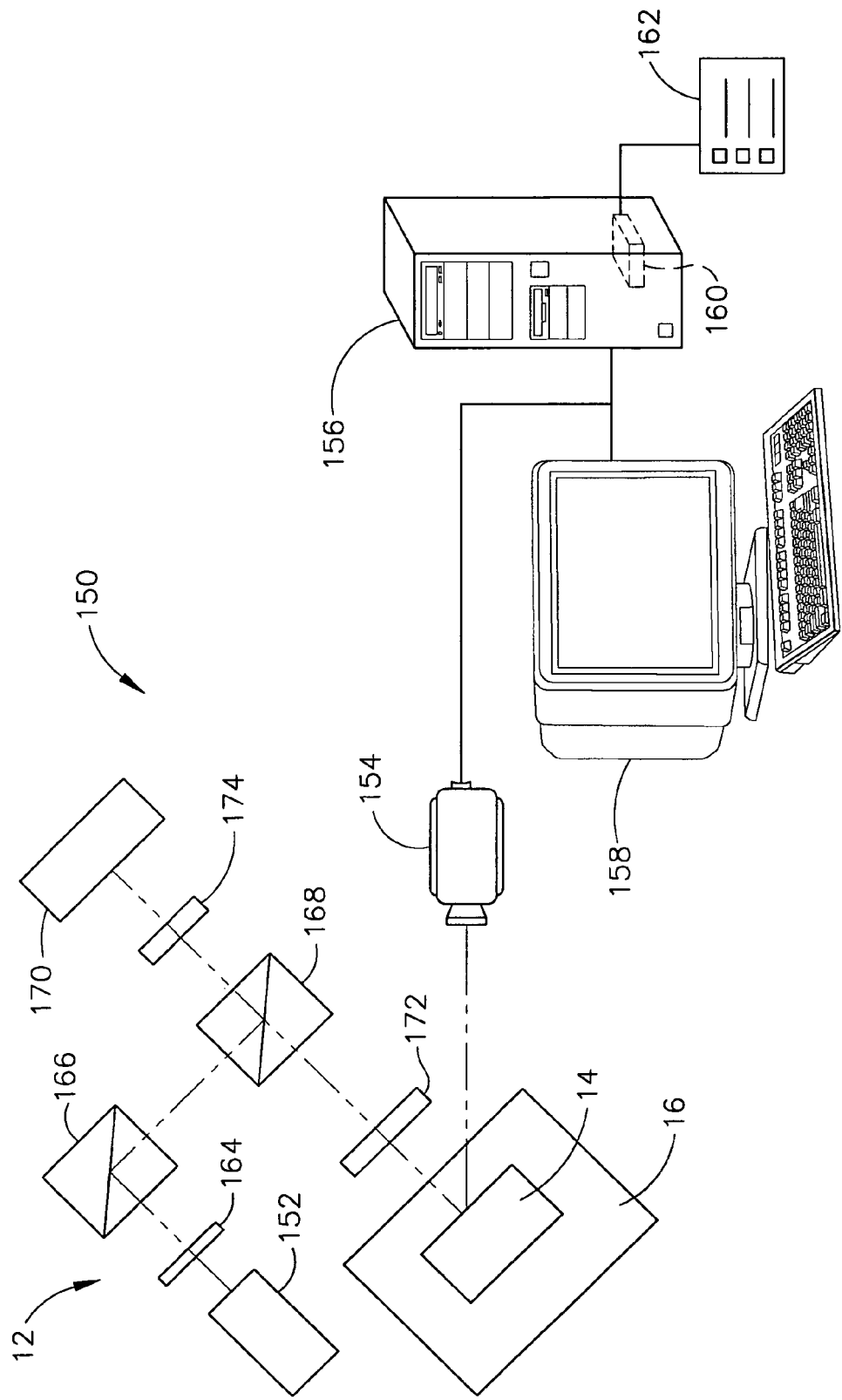
FIG. 5 is a block diagram of an another embodiment of a structured light measurement system.

FIG. 5 is a block diagram of another embodiment of a structured light measurement system 150 that is used to measure a plurality of surface features of object 12. More specifically, system 150 is used to inspect and determine surfaces of object 12, wherein the surfaces may include features such as tilts, bends, twists, and/or warps when compared to a model representative of object 12.

In the exemplary embodiment, object 12 is a rotor blade, such as, but not limited to, a compressor or turbine blade utilized in a turbine engine. Accordingly, and in the exemplary embodiment, object 12 includes airfoil 14 extending outwardly from platform 16. While the following description is directed to inspecting gas turbine engine blades, one skilled in the art will appreciate that system 150 may be utilized to improve structured light imaging for any object.

System 150 includes a laser 152 and one or more imaging sensors 154 that receive structured light reflected from object 12. In the exemplary embodiment, imaging sensor 154 is a camera that receives and creates images using structured light reflected from object 12, although system 150 may utilize other imaging sensors 154. One or more computers 156 process images received from sensors 154, and a monitor 158 may be utilized to display information to an operator. In one embodiment, computer(s) 156 include a device 160, for example, a floppy disk drive, CD-ROM drive, DVD drive, magnetic optical disk (MOD) device, and/or any other digital device including a network connecting device such as an Ethernet device for reading instructions and/or data from a computer-readable medium 162, such as a floppy disk, a CD-ROM, a DVD, and/or another digital source such as a network or the Internet, as well as yet to be developed digital means. In another embodiment, computer(s) 156 execute instructions stored in firmware (not shown). Computer(s) 156 are programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

System 150 also includes a lens 164, a beam splitter 166, a mirror 168, a digital micromirror device (DMD) 170, and a lens 172. Although other lens 164 may be used, in some embodiments lens 164 is a field lens, such as, but not limited to, a biconvex lens. Lens 164 is positioned at least partially between laser 152 and beam splitter 166, and receives and channels light emitted from laser 152 to beam splitter 166. Beam splitter 166 is positioned to disperse light emitted from laser 152 into an interference pattern by splitting and recombining the light. Although other beam splitters 166 may be used, in some embodiments beam splitter 166 is a half-silver mirror.

Patterned light dispersed from beam splitter 166 is reflected off mirror 168 and directed towards DMD 170 for, for example, control of light distribution and/or masking. Although other mirrors 168 may be used, in some embodiments mirror 168 is a half-silver mirror. Light reflected off DMD 170 is channeled through mirror 168 and received by lens 172. In some embodiments, a wave plate 174 is positioned between DMD 170 and mirror 168 to facilitate reducing a loss of light reflected off mirror 168 and DMD 170. Lens 172 receives and images the patterned light onto object 12 to illuminate object 12 with light emitted from laser 152. In the exemplary embodiment, lens 172 is a "high-resolution" lens, or more specifically, a lens that facilitates generating an image having a contrast of greater than about 50%. Although other lens 172 may be used, in some embodiments lens 172 is flat field lens, such as, but not limited to, an enlarger lens and/or a lithographic lens.

By combining beam splitter 166 and lens 172 with DMD 170, system 150 facilitates illuminating object 12 with a smooth pattern of light and facilitates increasing a resolution of light reflected from object 12, as compared to known light measurement systems using LCD, LCOS, and/or DMD devices as light sources. More specifically, beam splitter 166 facilitates dispersing light emitted from laser 152 into a smooth interference pattern of light. The interference created by beam splitter 166, in combination with a contrast generated by lens 172, can be selected to increase a resolution of light reflected from object 12, as compared to known light measurement systems using LCD, LCOS, and/or DMD devices.

Because system 150 reflects light off DMD 170, system 150 can adjust light levels projected onto different areas of the illuminated surface of object 12. Accordingly, areas of the illuminated surface of object 12 that are too light or too dark can be adjusted such that they are measurable by system 150, and more specifically viewable by imaging sensor 154. Moreover, in some embodiments, an electronic and/or physical mask (not shown) may be used in combination with laser 152 and/or DMD 170 to facilitate precluding laser 152 from illuminating surfaces at locations other than a portion of object 12 that is to be inspected. Such a mask may thereby facilitate reducing inter-reflections between surrounding structure, for example a test fixture, and surfaces of object 12 to be inspected. Moreover, such a mask may facilitate producing an illumination pattern on object 12 that substantially matches a profile of a portion of object 12 to be inspected, as viewed from the location of laser 152. Furthermore, because DMD 170 is not used as a light source, system 150 may facilitate increasing an operational life of DMD 170.

Although the systems and methods described and/or illustrated herein are described and/or illustrated with respect to gas turbine engine components, and more specifically an engine blade for a gas turbine engine, practice of the systems and methods described and/or illustrated herein is not limited to gas turbine engine blades, nor gas turbine engine components generally. Rather, the systems and methods described and/or illustrated herein are applicable to any object.

Exemplary embodiments of systems and methods are described and/or illustrated herein in detail. The systems and methods are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the assemblies and methods described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for inspecting an object using a light measurement system that includes a light source and an imaging sensor, said method comprising:
   emitting light from the light source;
   dispersing light emitted from the light source into one of a diffraction pattern and an interference pattern using a grating that includes a plurality of lines and spaces oriented in at least one of a ronchi ruling and a rectangular slit diffraction pattern;
   imaging the patterned light onto the object using a lens; and
   controlling a distribution of light imaged on the object, over different areas of a portion of the object to be inspected, using a liquid crystal device.

2. A method in accordance with claim 1 wherein emitting light from the light source comprises emitting light from one of a liquid crystal display (LCD) device, a digital micromirror device (DMD), a laser, a white light lamp, a light emitting diode (LED), and a liquid crystal on silicon (LCOS) device.

3. A method in accordance with claim 1 wherein dispersing light emitted from the light source into one of a diffraction pattern and an interference pattern comprises dispersing light emitted from the light source into a diffraction pattern using a diffraction grating.

4. A method in accordance with claim 1 wherein dispersing light emitted from the light source into one of a diffraction pattern and an interference pattern comprises dispersing light emitted from the light source into an interference pattern using a phase grating.

5. A method in accordance with claim 1 wherein dispersing light emitted from the light source into one of a diffraction pattern and an interference pattern comprises:
   splitting light emitted from the light source into two separate beams; and
   recombining the two separate beams of light to form the light into an interference pattern.

6. A method in accordance with claim 1 wherein imaging the patterned light onto the object using a lens comprises imaging the patterned light using a flat field lens.

7. A method in accordance with claim 1 wherein controlling a distribution of light imaged on the object over different areas of a portion of the object to be inspected further comprises using a digital micromirror device (DMD) to control the distribution of light.

8. A method in accordance with claim 7 wherein controlling a distribution of light imaged on the object comprises one of channeling light emitted from the light source through an LCD device and reflecting light emitted from the light source off a DMD device.

9. A method in accordance with claim 7 wherein the light source is one of an LCD projector and a DMD projector and controlling a distribution of light imaged on the object comprises controlling a distribution of light emitted from the light source.

10. A method in accordance with claim 1 further comprising masking light emitted by the light source to block light from illuminating areas of the object outside a portion of the object to be inspected and structures adjacent the object.

11. A structured light measurement system for inspecting an object, said structured light measurement system comprising:
- a structured light source configured to project structured light onto a surface of the object;
- an imaging sensor configured to receive structured light reflected from the object surface;
- a grating comprising a plurality of lines and spaces oriented in at least one of a ronchi ruling and a rectangular slit diffraction pattern, said grating positioned to disperse light emitted by said structured light source into at least one of a diffraction pattern and an interference pattern;
- a lens positioned to image patterned light received from said grating onto the object; and
- a liquid crystal device configured to control a distribution of light imaged on the object over different areas of a portion of the object to be inspected.

12. A system in accordance with claim 11 wherein said structured light source comprises one of a liquid crystal display (LCD) device, a digital micromirror device (DMD), a liquid crystal on silicon (LCOS) device a laser, a white light lamp, and a light emitting diode (LED).

13. A system in accordance with claim 11 wherein said grating comprises one of a diffraction grating and a phase grating.

14. A system in accordance with claim 11 wherein said lens comprises a flat field lens.

15. A system in accordance with claim 11 further comprising a liquid crystal display (LCD) device positioned at least partially between said grating and said lens.

16. A system in accordance with claim 11 further comprising:
- a digital micromirror device (DMD); and
- a mirror positioned to receive patterned light from said grating, reflect the patterned light off said DMD, and direct patterned light reflected off said DMD to said lens.

17. A system in accordance with claim 16 wherein said mirror comprises a half-silver mirror.

18. A system in accordance with claim 16 further comprising a wave plate positioned at least partially between said DMD and said mirror.

19. A structured light measurement system for inspecting an object, said structured light measurement system comprising:
- a laser configured to project structured light onto a surface of the object;
- an imaging sensor configured to receive structured light reflected from the object surface;
- a beam splitter positioned at least partially between said laser and the object for dispersing light emitted by said laser into an interference pattern;
- a first lens positioned at least partially between said laser and said beam splitter;
- a second lens positioned to image patterned light received from said beam splitter onto the object; and
- a liquid crystal device configured to control a distribution of light imaged on the object over different areas of a portion of the object to be inspected.

20. A system in accordance with claim 19 wherein said beam splitter comprises a half-silver mirror.

21. A system in accordance with claim 19 wherein said first lens and said second lens each comprises a flat field lens.

22. A system in accordance with claim 19 further comprising a liquid crystal display (LCD) device positioned at least partially between said beam splitter and said second lens.

23. A system in accordance with claim 19 wherein said liquid crystal device further comprises:
- a digital micromirror device (DMD); and
- a mirror positioned to receive patterned light from said beam splitter, reflect the patterned light off said DMD, and direct patterned light reflected off said DMD to said second lens.

24. A system in accordance with claim 23 wherein said mirror comprises a half-silver mirror.

25. A system in accordance with claim 23 further comprising a wave plate positioned at least partially between said DMD and said mirror.

* * * * *

UNITED STATES PATENT AND TRADEMARK OFFICE
CERTIFICATE OF CORRECTION

| | |
|---|---|
| PATENT NO. | : 7,492,450 B2 |
| APPLICATION NO. | : 11/257182 |
| DATED | : February 17, 2009 |
| INVENTOR(S) | : Harding et al. |

It is certified that error appears in the above-identified patent and that said Letters Patent is hereby corrected as shown below:

In the Specification, column 7, line 62, delete "hut not" and insert therefor --but not--.
In Claim 7, column 13, line 7, delete "(DMD)to" and insert therefor --(DMD) to--.

Signed and Sealed this

Ninth Day of February, 2010

David J. Kappos
*Director of the United States Patent and Trademark Office*